(12) United States Patent
Osajima (10) Patent No.: US 12,418,618 B2
(45) Date of Patent: Sep. 16, 2025

(54) INFORMATION PROCESSING APPARATUS, INFORMATION PROCESSING METHOD, AND NON-TRANSITORY COMPUTER READABLE MEDIUM

(71) Applicant: FUJIFILM Business Innovation Corp., Tokyo (JP)

(72) Inventor: Kentaro Osajima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 364 days.

(21) Appl. No.: 17/882,991

(22) Filed: Aug. 8, 2022

(65) Prior Publication Data

US 2023/0231954 A1 Jul. 20, 2023

(30) Foreign Application Priority Data

Jan. 20, 2022 (JP) ................................ 2022-006876

(51) Int. Cl.
*G06F 15/00* (2006.01)
*H04N 1/00* (2006.01)
*H04N 1/32* (2006.01)

(52) U.S. Cl.
CPC ..... *H04N 1/00244* (2013.01); *H04N 1/00347* (2013.01); *H04N 1/32678* (2013.01); *H04N 2201/007* (2013.01)

(58) Field of Classification Search
None
See application file for complete search history.

(56) References Cited

U.S. PATENT DOCUMENTS

| 8,264,725 | B1* | 9/2012 | Pillutla | H04N 1/00244 |
| | | | | 358/1.14 |
| 8,730,504 | B2 | 5/2014 | Stokes et al. | |
| 8,908,220 | B2 | 12/2014 | Miyazawa et al. | |
| 8,976,400 | B2 | 3/2015 | Stokes et al. | |
| 2012/0075665 | A1* | 3/2012 | Sambe | G06F 3/126 |
| | | | | 358/1.15 |
| 2012/0293830 | A1* | 11/2012 | Burke, Jr. | H04N 1/32368 |
| | | | | 358/1.15 |
| 2013/0003115 | A1 | 1/2013 | Uchikawa | |
| 2015/0062647 | A1 | 3/2015 | Miyazawa et al. | |
| 2017/0019550 | A1* | 1/2017 | Sasaki | H04N 1/00923 |
| 2018/0018137 | A1* | 1/2018 | Yoshimura | G06F 3/1203 |

FOREIGN PATENT DOCUMENTS

| JP | 5885111 B2 | 3/2016 |
| JP | 5885410 B2 | 3/2016 |
| JP | 5885818 B2 | 3/2016 |

* cited by examiner

*Primary Examiner* — Mark R Milia
(74) *Attorney, Agent, or Firm* — Oliff PLC (57) ABSTRACT

An information processing apparatus includes a processor configured to: acquire a processing request that includes a document; request an external server to perform a process included in the acquired processing request, the external server being connectable from the information processing apparatus and being responsible for performing the process; and transmit second information to an apparatus communicable with the information processing apparatus, the second information including first information to be used for acquiring a processed document serving as the document processed by the external server.

13 Claims, 8 Drawing Sheets

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-006876 filed Jan. 20, 2022.

BACKGROUND

(i) Technical Field

The present disclosure relates to information processing apparatuses, information processing methods, and non-transitory computer readable media.

(ii) Related Art

For example, Japanese Patent No. 5885111 discloses a scan system that includes a user device. The user device includes a controller that generates a cloud scan request as a request for scanning a document by using a cloud service, a transmitter that transmits the cloud scan request to a cloud printing service device realized by a first computer, and a receiver that receives, from the cloud printing service device, a status signal indicating that the cloud scan request has been fulfilled. In order to acquire the status of the cloud scan request, the controller performs polling with respect to the cloud printing service device. Based on the status signal, the transmitter transmits a file request from the user device to a cloud document service device. In accordance with the file request, the receiver receives, from the cloud document service device, an image file corresponding to the cloud scan request and acquired by a third computer. The image file includes a document image.

SUMMARY

In a case where an apparatus that has acquired a document processing request commands an external server to process a document and receives the processed document, it may possibly be difficult for the apparatus to handle a subsequent processing request to be acquired.

Aspects of non-limiting embodiments of the present disclosure relate to reducing the load on the apparatus, as compared with the case where the apparatus that has acquired the document processing request commands the external server to process the document and receives the processed document.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a processor configured to: acquire a processing request that includes a document; request an external server to perform a process included in the acquired processing request, the external server being connectable from the information processing apparatus and being responsible for performing the process; and transmit second information to an apparatus communicable with the information processing apparatus, the second information including first information to be used for acquiring a processed document serving as the document processed by the external server.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described in detail below with reference to the appended drawings.

Figure 1:
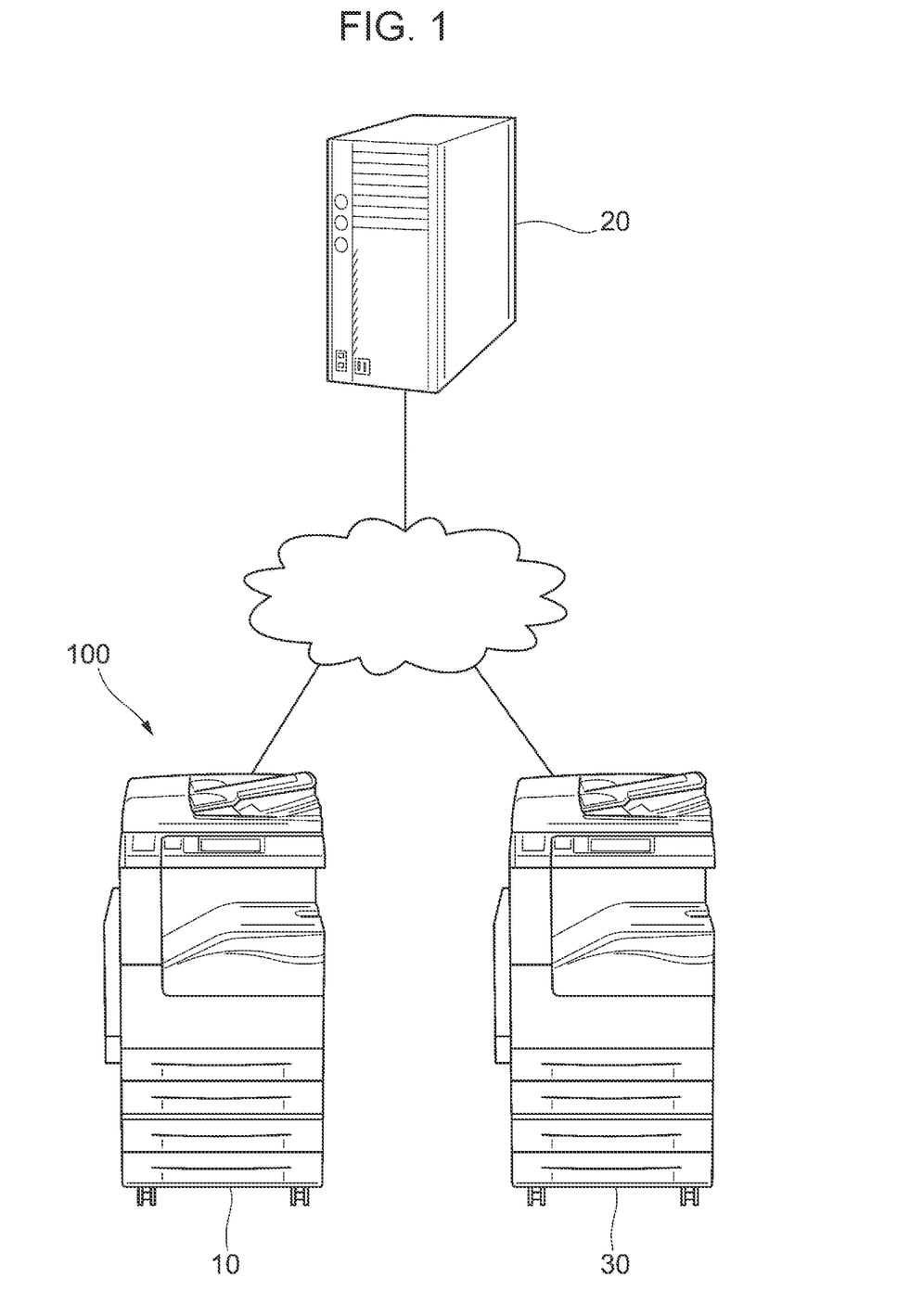
FIG. 1 illustrates the configuration of an information processing system.

FIG. 1 illustrates the configuration of an information processing system 100.

The information processing system 100 shown in FIG. 1 includes an image forming apparatus 10 that prints an image onto a sheet. The image forming apparatus 10 is connected in a communicable manner to a server apparatus 20 and another image forming apparatus 30 (simply referred to as "image forming apparatus 30" hereinafter).

A network that connects the image forming apparatuses 10 and 30 and the server apparatus 20 to one another is, for example, a local area network (LAN) or the Internet. Alternatively, the network may be a combination of the LAN and the Internet.

In addition to having the function for printing an image onto a sheet, the image forming apparatus 10 has a scanning function for optically scanning an image of, for example, a document and a function for executing facsimile communication. The image forming apparatus 10 is also referred to as a multifunction apparatus. The image forming apparatus 10 may alternatively be a so-called production printer used in commercial printing. The functions mentioned above with respect to the image forming apparatus 10 are merely examples and may include other functions.

The printing function of the image forming apparatus 10 may use, for example, an electrophotographic method involving transferring toner adhered on a photoconductor that has been electrostatically-charged and exposed to light onto a recording medium and fixing an image onto the recording medium or an inkjet method involving forming an image onto a recording medium by ejecting ink thereto.

The image forming apparatus 10 is equipped with an operational display including a display and an input unit. The display displays various types of operational images and various types of information for providing notifications to a user. The input unit has various types of input buttons to be used in accordance with the operational images on the display. The operational display may serve as, for example, a display screen of a touchscreen and may have the functions of the display and the input unit on the touchscreen.

The server apparatus 20 may be a single physical computer or may be implemented in accordance with distributed processing by multiple computers. In this exemplary embodiment, the server apparatus 20 serves as a shared server that provides a so-called cloud service. The server apparatus 20 may be regarded as an external server.

The image forming apparatus 30 may be identical to or different from the image forming apparatus 10. The image forming apparatus 10 may store information indicating which of the functions the image forming apparatus 30 has.

The following relates to a conceivable case where the image forming apparatus 10 serving as a client terminal acquires a document processing request and thus commands the server apparatus 20 to serve as a cloud service to process a document. When the image forming apparatus 10 receives a processing result of the cloud service and performs a subsequent process, the processing load of the image forming apparatus 10 becomes excessive as a result of handling a subsequent processing request, thus making it difficult for the image forming apparatus 10 to perform the process smoothly. On the other hand, if the throughput of the image forming apparatus 10 is increased for maintaining a smooth process, the cost of the image forming apparatus 10 may possibly increase.

In this exemplary embodiment, the processing result of the cloud service commanded by the image forming apparatus 10 to the server apparatus 20 is received by the image forming apparatus 30 instead of the image forming apparatus 10, so that the processing load of the image forming apparatus 10 may be reduced. Moreover, by employing this configuration, the cost for enhancing the throughput of the image forming apparatus 10 may be suppressed.

This configuration will be described in further detail below.

Figure 2:
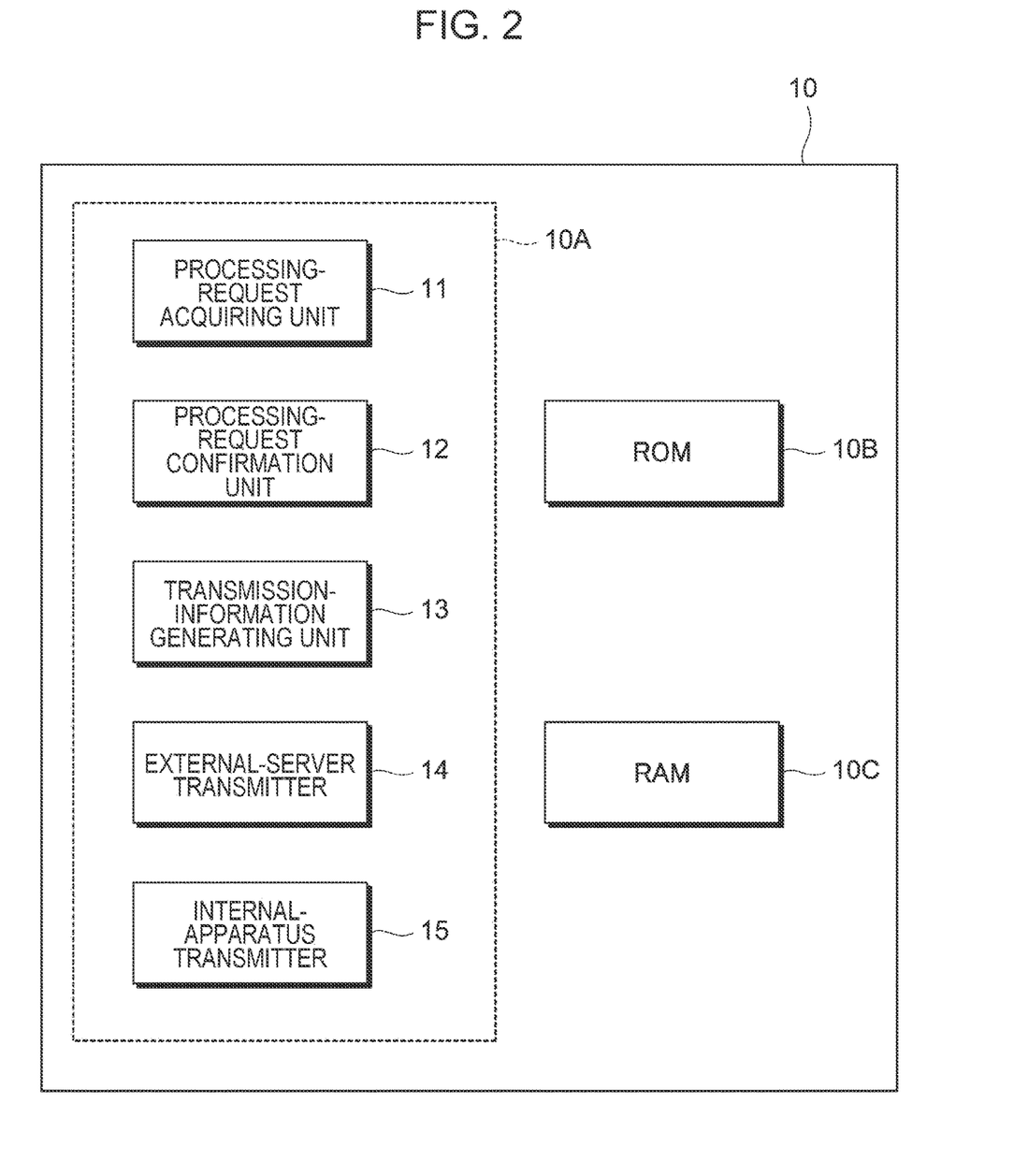
FIG. 2 is a functional block diagram of an image forming apparatus.

FIG. 2 is a functional block diagram of the image forming apparatus 10.

As shown in FIG. 2, the image forming apparatus 10 includes a processing-request acquiring unit 11, a processing-request confirmation unit 12, a transmission-information generating unit 13, an external-server transmitter 14, and an internal-apparatus transmitter 15.

The processing-request acquiring unit 11 receives a processing request transmitted from the user. Such a processing request includes a document, such as a scanned document acquired from a paper document in accordance with the scanning function of the image forming apparatus 10 or a facsimile document acquired in accordance with the facsimile function. The scanned document may be acquired in accordance with a function included in another apparatus instead of the image forming apparatus 10. Another conceivable example of the document is a portable-document-format (PDF) document acquired in accordance with communication by the image forming apparatus 10.

The processing request may be acquired as a result of a designation by the user via the operational display of the image forming apparatus 10 or may be acquired from a personal computer (PC) (not shown) connected in a communicable manner to the image forming apparatus 10.

The processing-request confirmation unit 12 confirms the content of the processing request acquired by the processing-request acquiring unit 11. If the processing request is a combination of multiple jobs, the content of each job is confirmed. For example, the processing request may conceivably include a leading job involving translating a Japanese document into English and a trailing job involving printing the English document. Furthermore, the trailing job included in the processing request may conceivably include forwarding the English document to another server apparatus or transmitting the English document by facsimile.

More specifically, if the trailing job involves printing, the processing-request confirmation unit 12 confirms the printing conditions, such as the sheet size and the printing mode, i.e., color printing or monochrome printing. If the trailing job involves forwarding, the processing-request confirmation unit 12 confirms information indicating a server apparatus serving as a forwarding destination. If the trailing job involves facsimile transmission, the processing-request confirmation unit 12 confirms information indicating a transmission destination.

The processing-request confirmation unit 12 further confirms an apparatus that is to perform a job included in the processing request. If the processing request is a combination of multiple jobs, the processing-request confirmation unit 12 confirms an apparatus that is to perform each job. For example, there may conceivably be a case where the apparatus that is to perform the leading job included in the processing request is the server apparatus 20 (see FIG. 1) and the apparatus that is to perform the trailing job is the image forming apparatus 30 (see FIG. 1). Accordingly, an apparatus that is to perform a job included in the processing request is an apparatus other than the image forming apparatus 10 that has acquired the processing request.

If the processing request does not include information indicating an apparatus that is to perform a job, the processing-request confirmation unit 12 sets the apparatus that is to perform the job included in the processing request in accordance with information stored in the processing-request confirmation unit 12.

The transmission-information generating unit 13 generates transmission information based on the aforementioned confirmation performed by the processing-request confirmation unit 12. Such transmission information is generated for each apparatus that is to perform the corresponding job included in the processing request. Specifically, the transmission-information generating unit 13 generates transmission information to be transmitted to the server apparatus 20 (see FIG. 1), and also generates transmission information to be transmitted to the image forming apparatus 30.

More specifically, if the processing request includes information indicating a designated apparatus designated as an apparatus that is to perform a job, the transmission-information generating unit 13 may set information indicating a substitute apparatus serving as a substitute for the apparatus that is to perform the relevant job in accordance with information stored in the transmission-information generating unit 13, and may allow the transmission information to include the set information. For example, if the designated apparatus becomes incapable of acquiring the document having undergone the leading job before acquiring the document from the server apparatus 20, an apparatus that is to take over the trailing job may be set as a substitute apparatus, so that a situation where the trailing job is non-executable may be avoided.

Even in a case where the processing request does not include information indicating an apparatus that is to perform a job, the aforementioned substitute apparatus may be set in addition to the apparatus that is to perform the job.

The aforementioned information indicating the substitute apparatus may include information indicating priority levels. In the information indicating the priority levels, for example, there may conceivably be a case where the apparatus designated in the processing request is set at the highest priority level and the substitute apparatus is set at a lower priority level. In another conceivable case, the substitute apparatus may be set at the highest priority level and the apparatus designated in the processing request may be set at a priority level lower than that of the substitute apparatus. Furthermore, if there are multiple substitute apparatuses, a priority level may be set for each substitute apparatus.

Moreover, the aforementioned information indicating the substitute apparatus may indicate that the relevant apparatus itself is set at the lowest priority level.

Furthermore, even in a case where the information indicating the substitute apparatus does not include priority levels, the relevant apparatus itself may serve as a substitute apparatus. Specifically, in a case where the relevant apparatus itself is to serve as a substitute apparatus, if the designated apparatus is not capable of acquiring the document having undergone the leading job, the designated apparatus requests itself to take over the process.

The transmission-information generating unit 13 generates transmission information based on the aforementioned confirmation performed by the processing-request confirmation unit 12. Such transmission information is generated for each apparatus that is to perform the corresponding job included in the processing request. Specifically, the transmission-information generating unit 13 generates transmission information to be transmitted to the server apparatus 20 (see FIG. 1), and also generates transmission information to be transmitted to the image forming apparatus 30.

Furthermore, in order to cope with a case where communication with an apparatus that is to perform a job included in the processing request is not possible, the transmission-information generating unit 13 may use information indicating a candidate for executing the job to select another apparatus.

More specifically, the image forming apparatus 10 stores an address of the image forming apparatus 30 as setting information. In order to cope with a case where the image forming apparatus 30 is turned off or is in a non-communicable state, the image forming apparatus 10 may store addresses of multiple image forming apparatuses in a grouped format. If the image forming apparatus 10 does not have information about multiple image forming apparatuses stored therein, the image forming apparatus 10 may designate its own address.

The transmission-information generating unit 13 may allow the transmission information to include information for designating a unit of acquisition of the document having undergone the leading job by the apparatus that is to perform the trailing job. The unit designation information may designate that the entire document having undergone the leading job is to be collectively acquired or may designate that the document having undergone the leading job is to be partially acquired. In the latter case, for example, the unit may be set to a predetermined value, such as one page.

The aforementioned unit is a unit of acquisition by the apparatus that is to perform the trailing job, but may also be regarded as a unit of transmission by the apparatus that is to perform the leading job.

The external-server transmitter 14 transmits, to the server apparatus 20, the transmission information generated by the transmission-information generating unit 13 for the server apparatus 20 (see FIG. 1). Accordingly, the image forming apparatus 10 requests the server apparatus 20 to perform a process that the server apparatus 20 is responsible for and that is included in the processing request acquired by the processing-request acquiring unit 11.

The internal-apparatus transmitter 15 transmits, to the image forming apparatus 30, the transmission information generated by the transmission-information generating unit 13 for the image forming apparatus 30 (see FIG. 1). This transmission information is an example of second information.

The transmission information for the image forming apparatus 30 includes information to be used for acquiring the document having undergone the leading job, that is, information indicating the server apparatus 20 (see FIG. 1) serving as the apparatus that is to perform the leading job.

The term "internal apparatus" refers to an internal apparatus relative to the external server in the external-server transmitter 14, and the transmission destination of the internal-apparatus transmitter 15 is not limited to an apparatus located in an on-premises environment.

The functions of the image forming apparatus 10 are implemented by a CPU 10A serving as an example of a processor. The CPU 10A reads a program stored in a read-only memory (ROM) 10B and executes the program by using a random access memory (RAM) 10C as a work area. The program to be executed by the CPU 10A may be provided to the image forming apparatus 10 by being stored in a computer-readable storage medium, such as a magnetic storage medium (e.g., magnetic tape or a magnetic disk), an optical storage medium (e.g., an optical disk), a magneto-optical storage medium, or a semiconductor memory. Alternatively, the program to be executed by the CPU 10A may be downloaded to the image forming apparatus 10 by using a communication unit, such as the Internet.

In this exemplary embodiment, the functions of the image forming apparatus 10 are implemented by software, but are not limited thereto. For example, the functions may be implemented by an application specific integrated circuit (ASIC).

Figure 3:
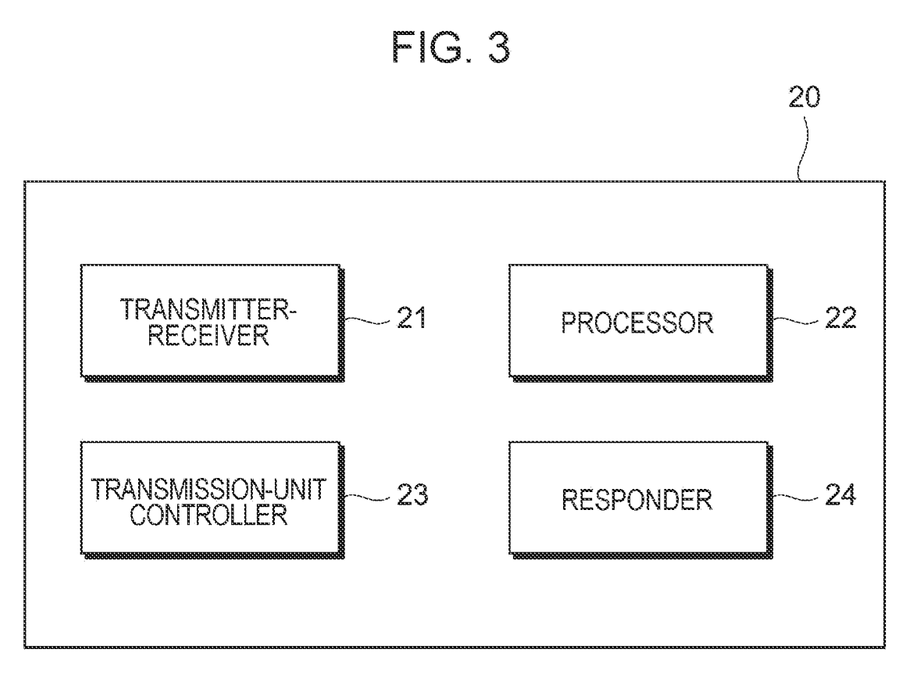
FIG. 3 is a functional block diagram of a server apparatus.

FIG. 3 is a functional block diagram of the server apparatus 20.

As shown in FIG. 3, the server apparatus 20 includes a transmitter-receiver 21, a processor 22, a transmission-unit controller 23, and a responder 24.

The transmitter-receiver 21 performs transmission and reception with respect to the image forming apparatuses 10 and 30. For example, the transmitter-receiver 21 receives the transmission information from the external-server transmitter 14 of the image forming apparatus 10 and transmits a document processed by the processor 22 to the image forming apparatus 30.

The processor 22 performs a process as the aforementioned leading job based on the transmission information received by the transmitter-receiver 21. The document having undergone the aforementioned leading job in accordance with the process is transmitted to the image forming apparatus 30 or the image forming apparatus 10 by the transmitter-receiver 21.

The transmission-unit controller 23 controls the transmission from the transmitter-receiver 21 to the image forming apparatus 30 in accordance with the processing status of the processor 22 based on unit designation information included in the transmission information received by the transmitter-receiver 21.

The unit designation information designates a unit of acquisition by the apparatus that is to perform the trailing job and is used for controlling the transmission timing of the document having undergone the leading job. For example, if the unit designation information corresponds to the entire document, the transmission-unit controller 23 performs control such that the document having undergone the leading job is entirely transmitted to the image forming apparatus 30 upon completion of the leading job.

If the unit designation information corresponds to a predetermined part, such as one page, of the entire document, the transmission-unit controller 23 causes one page of the document having undergone the leading job to be transmitted to the image forming apparatus 30 after one page worth of the document has undergone the leading job. Upon completion of the process for a subsequent single page, control is performed such that the subsequent single page of the document is transmitted to the image forming apparatus 30.

The responder 24 responds to an inquiry when there is periodic polling from the apparatus that is to perform the trailing job, such as the image forming apparatus 30. Accordingly, it is confirmed by both the server apparatus 20 and the image forming apparatus 30 that the two apparatuses are communicable with each other. Moreover, the image forming apparatus 30 is periodically notified of the processing status of the processor 22 in the server apparatus 20.

Figure 4:
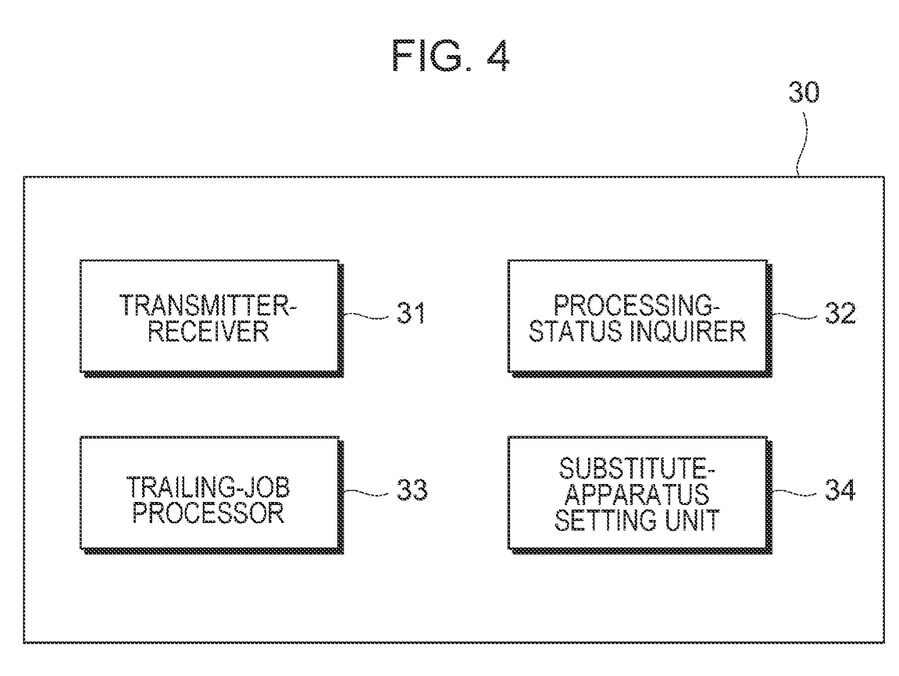
FIG. 4 is a functional block diagram of an image forming apparatus.

FIG. 4 is a functional block diagram of the image forming apparatus 30.

As shown in FIG. 4, the image forming apparatus 30 includes a transmitter-receiver 31, a processing-status inquirer 32, a trailing-job processor 33, and a substitute-apparatus setting unit 34.

The transmitter-receiver 31 performs transmission and reception with respect to the image forming apparatus 10 and the server apparatus 20. For example, the transmitter-receiver 31 receives the transmission information from the internal-apparatus transmitter 15 and receives the document processed by the processor 22 of the server apparatus 20.

More specifically, the transmitter-receiver 31 may transmit, to a predetermined apparatus, the document having undergone the trailing job included in the transmission information from the internal-apparatus transmitter 15. Furthermore, the transmitter-receiver 31 may directly forward, to a predetermined apparatus, the document processed by the processor 22.

The processing-status inquirer 32 performs periodic polling to inquire the server apparatus 20 about the processing status of the leading job by the processor 22 of the server apparatus 20. The processing-status inquirer 32 receives a response from the responder 24 of the server apparatus 20.

The trailing-job processor 33 executes a process corresponding to the trailing job included in the transmission information from the internal-apparatus transmitter 15 of the image forming apparatus 10. Examples of this process include printing, facsimile transmission, and mail notification.

For example, if the trailing job is printing, the trailing-job processor 33 forms an image and prints the image onto a recording medium in accordance with printing conditions included in the transmission information from the image forming apparatus 10. If the trailing job is facsimile transmission, the trailing-job processor 33 transmits, by facsimile, the document having undergone the leading job to a transmission destination included in the transmission information from the image forming apparatus 10.

If the information indicating the substitute apparatus is included in the transmission information from the internal-apparatus transmitter 15 of the image forming apparatus 10, the substitute-apparatus setting unit 34 sets the aforementioned substitute apparatus based on the information indicating the substitute apparatus.

As mentioned above, the substitute apparatus in the case where the image forming apparatus 30 receives the transmission information from the internal-apparatus transmitter 15 serves as a substitute for the image forming apparatus 10 if the image forming apparatus 30 becomes incapable of acquiring the document having undergone the leading job from the server apparatus 20, and is to acquire the document having undergone the leading job from the server apparatus 20 and execute the trailing job. The image forming apparatus 10 may sometimes be set as the substitute apparatus depending on the information indicating the substitute apparatus.

Furthermore, if the transmission information from the internal-apparatus transmitter 15 includes the information indicating the priority levels together with the information indicating the substitute apparatus, the substitute-apparatus setting unit 34 checks for a communicable state with apparatuses starting from higher priority levels. Of apparatuses confirmed to be in a communicable state, the substitute-apparatus setting unit 34 sets the apparatus with the highest priority level as the substitute apparatus. The information about the set substitute apparatus may be transmitted to the image forming apparatus 10 in addition to or instead of being stored in the image forming apparatus 30.

If the information indicating the priority levels designates the image forming apparatus 10 as the apparatus with the lowest priority level, the image forming apparatus 10 may sometimes be set as the substitute apparatus.

Next, processing examples in a case where the image forming apparatus 10 acquires the processing request will be described with reference to FIGS. 5 to 7.

Figure 5:
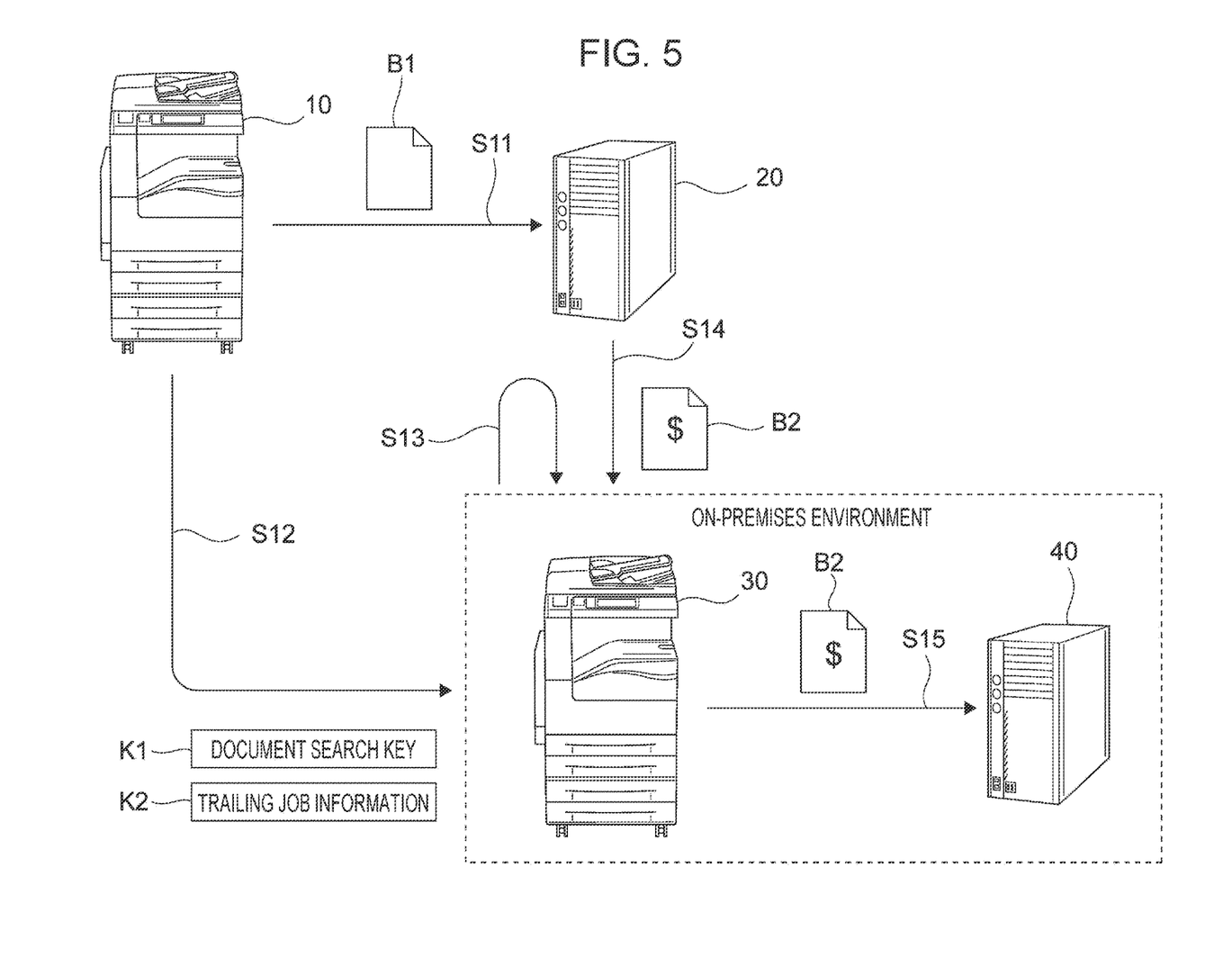
FIG. 5 illustrates a first example as a processing example in a case where the image forming apparatus acquires a processing request.
Figure 6:
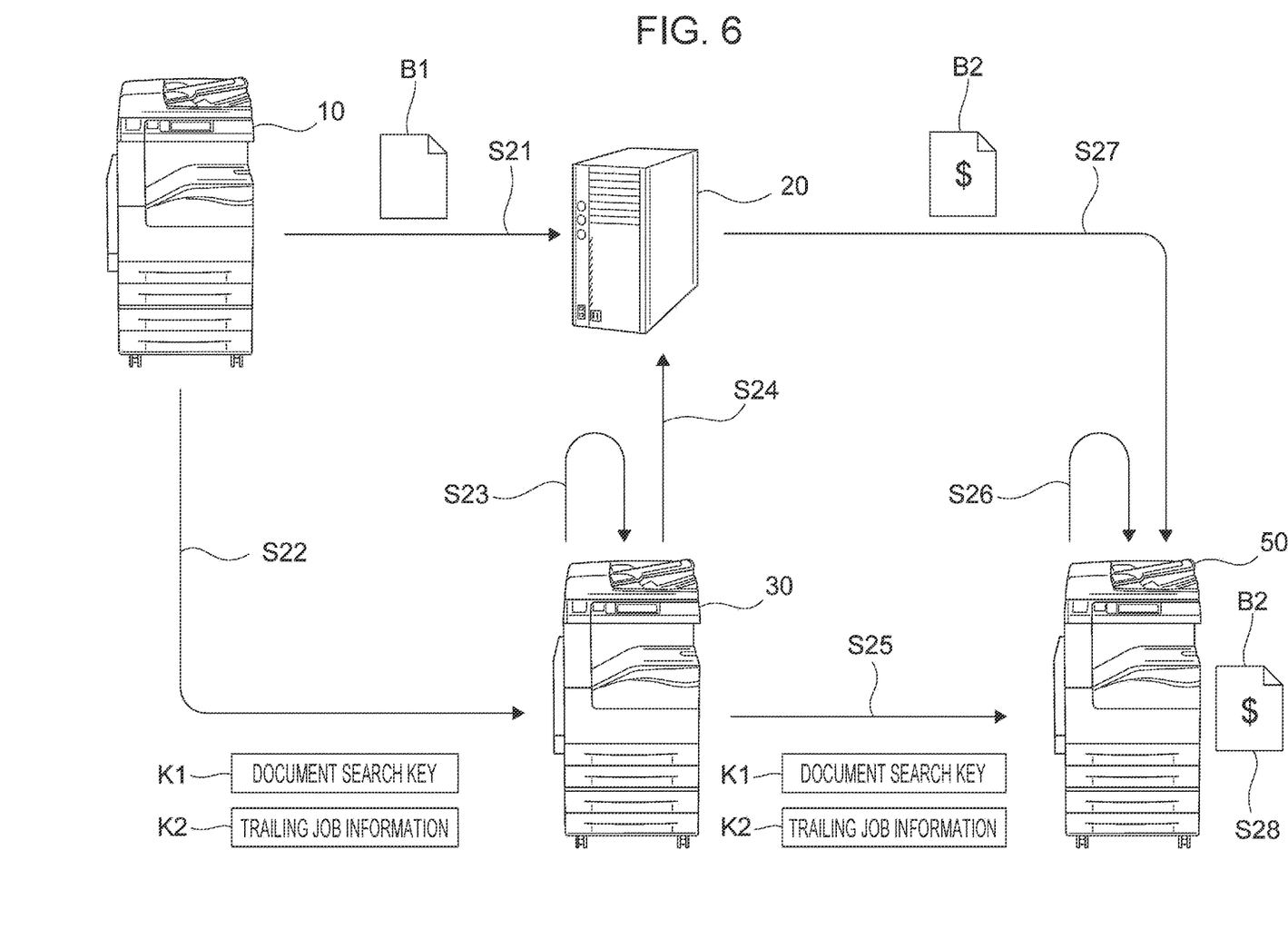
FIG. 6 illustrates a second example as a processing example in the case where the image forming apparatus acquires the processing request.
Figure 7:
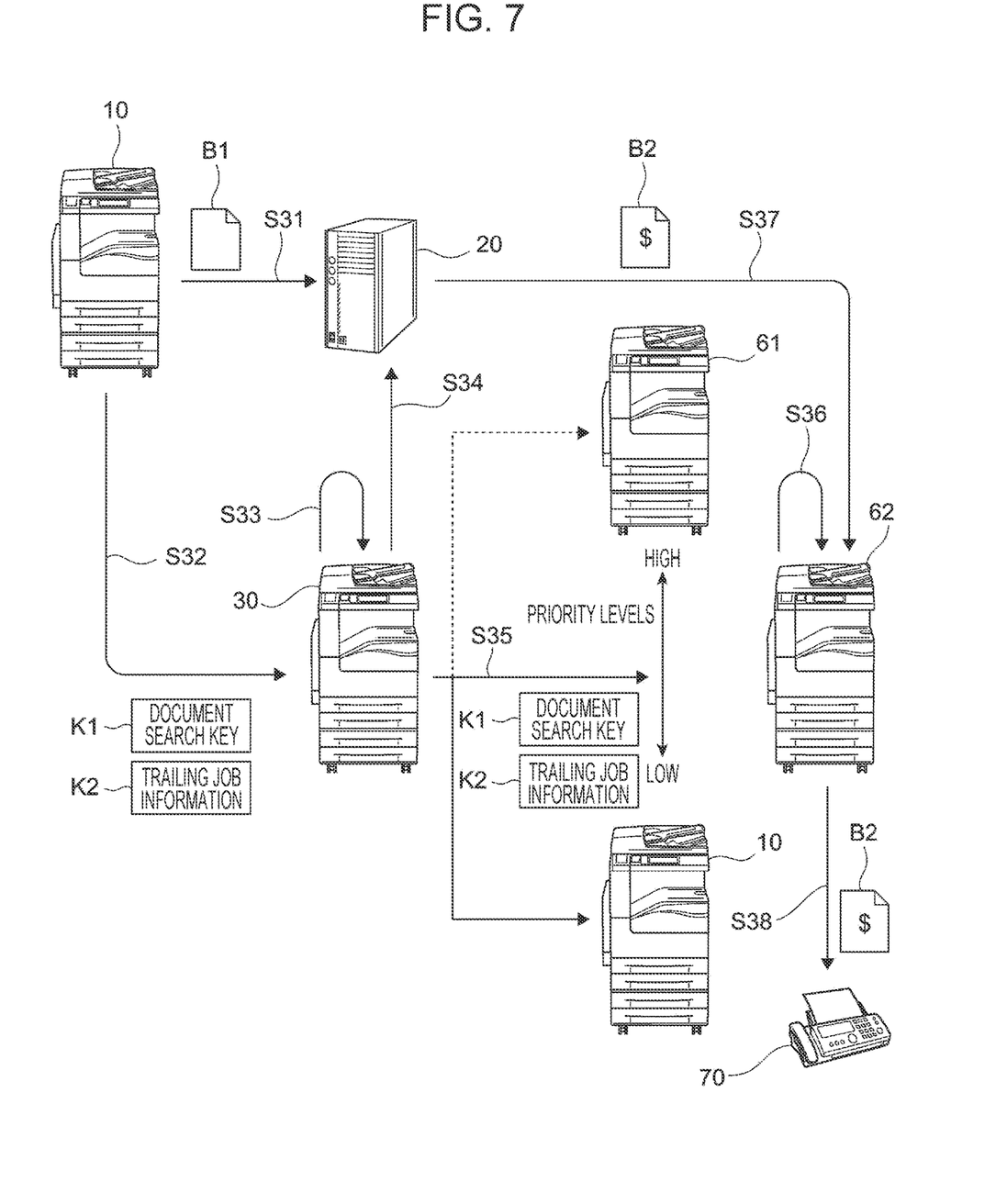
FIG. 7 illustrates a third example as a processing example in the case where the image forming apparatus acquires the processing request.

FIGS. 5 to 7 illustrate the processing examples in the case where image forming apparatus 10 acquires the processing request. Specifically, FIG. 5 illustrates a first example, FIG. 6 illustrates a second example, and FIG. 7 illustrates a third example.

First Example

FIG. 5 illustrates the first example as one of the processing examples in the case where the image forming apparatus 10 acquires the processing request.

The first example shown in FIG. 5 corresponds to the configuration shown in FIG. 1 as the above exemplary embodiment in that the image forming apparatuses 10 and 30 and the server apparatus 20 are provided, and that a server apparatus 40 located in an on-premises environment with the image forming apparatus 30 is further provided.

The image forming apparatus 10 is an example of an information processing apparatus. The server apparatus 20 is an example of an external server connectable from the image forming apparatus 10. The image forming apparatus 30 is an example of an apparatus communicable with the image forming apparatus 10.

More specifically, the server apparatus 20 is located in a cloud environment operated in a facility owned by an external operator, whereas the server apparatus 40 has an in-house information system and is located within an on-premises environment operated by an in-house facility.

The server apparatus 40 is a locally-installed storage server and is an example of another apparatus installed in an internal environment where an apparatus for a processed document is installed.

In the first example, the leading job in the processing request is a translation process, and the apparatus that is to execute the translation process is the server apparatus 20. The trailing job is a forwarding process, and the apparatus that is to execute the forwarding process is the image forming apparatus 30.

In the first example, when the processing-request acquiring unit 11 (see FIG. 2) of the image forming apparatus 10 acquires the processing request, the processing-request confirmation unit 12 (see FIG. 2) confirms the processing request. Subsequently, the transmission-information generating unit 13 (see FIG. 2) generates server-apparatus-oriented transmission information as transmission information to be transmitted to the server apparatus 20 and client-apparatus-oriented transmission information as transmission information to be transmitted to the image forming apparatus 30.

The server-apparatus-oriented transmission information includes a document B1 to be translated. The client-apparatus-oriented transmission information includes a document search key K1 for identifying the document B1 as well as trailing job information K2.

The translation process as the leading job is an example of a process to be performed by an external server connectable from the information processing apparatus.

The document search key K1 is an example of first information, and the trailing job information K2 is an example of information indicating a process to be performed on the processed document by an apparatus.

One example of the cloud service of the server apparatus 20 to which the server-apparatus-oriented transmission information is transmitted is a scan translation service, as in the first example. When the scan translation service receives the document B1 having text strings in a specific language from the image forming apparatus 10 serving as a client terminal, the scan translation service processes the document B1 and subsequently translates the document B1 into another specific language. The processing time in the server apparatus 20 varies depending on, for example, the amount of text in the document B1.

The document search key K1 in the client-apparatus-oriented transmission information includes information for uniquely identifying the document B1, such as a uniform resource locator (URL) of the cloud service.

The trailing job information K2 in the client-apparatus-oriented transmission information conceivably includes, for example, printing, mail notification, facsimile transmission, and forwarding to a locally-installed storage server. As mentioned above, in the first example, the trailing job information K2 corresponds to a forwarding process and includes a command and forwarding information to be forwarded to, for example, the server apparatus 40. Moreover, the trailing job information K2 may be a job instruction written in an extensible markup language (XML) and designates various parameters to be used for executing the trailing job.

The external-server transmitter 14 (see FIG. 2) transmits the server-apparatus-oriented transmission information to the server apparatus 20 in step S11, and the internal-apparatus transmitter 15 (see FIG. 2) transmits the client-apparatus-oriented transmission information to the image forming apparatus 30 in step S12.

In the server apparatus 20, when the transmitter-receiver 21 (see FIG. 3) receives the server-apparatus-oriented transmission information, the processor 22 (see FIG. 3) starts a translation process. On the other hand, in the image forming apparatus 30, when the transmitter-receiver 31 (see FIG. 4) receives the client-apparatus-oriented transmission information, the processing-status inquirer 32 (see FIG. 4) performs periodic polling with respect to the server apparatus 20 by using the document search key in step S13. The image forming apparatus 30 receives a response from the responder 24 (see FIG. 3) of the external-server transmitter 14, so as to acquire the processing status.

When the image forming apparatus 30 receives a document B2 (i.e., a document indicated by reference sign $ in FIG. 5) having undergone the translation process in the server apparatus 20 in step S14, the trailing-job processor 33 (see FIG. 4) forwards the document B2 to the server apparatus 40 in accordance with the trailing job information in step S15.

Because the translated document B2 is automatically stored in the server apparatus 40 located in the on-premises environment, this example is effective in a case where there are high security concerns. Furthermore, as mentioned above, since the processing time in the server apparatus 20 varies depending on, for example, the amount of text in the document B1, this example is an effective solution for preventing one from forgetting to perform an operation in a case where the document B2 is to be moved from the image forming apparatus 30 to the server apparatus 40 in accordance with a manual operation. Moreover, with the automatization, the time and effort used for searching for the document B2 in the image forming apparatus 30 when a manual operation is to be performed may be omitted.

The document B1 is an example of a document included in the processing request, and the document B2 is an example of a processed document serving as a document processed by the external server.

If the server-apparatus-oriented transmission information includes information for designating the unit of transmission of the document B2 in step S14 described above, the transmission-unit controller 23 (see FIG. 3) of the server apparatus 20 controls the transmission timing. This transmission timing is similarly controllable when the information for designating the unit of transmission of the translated document B2 is included in the client-apparatus-oriented transmission information instead of the server-apparatus-oriented transmission information.

More specifically, if the image forming apparatus 30 is notified by the server apparatus 20 that the process is partially completed (see step S13), the image forming apparatus 30 may acquire the completed part of the process and allow the user to select whether the trailing job is to be executed. In this case, the transmission-unit controller 23 of the server apparatus 20 controls the transmission timing in accordance with a user command from the image forming apparatus 30. In the above-described case, the configuration of the server apparatus 20 may be simplified.

Second Example

FIG. 6 illustrates the second example as one of the processing examples in the case where the image forming apparatus 10 acquires the processing request.

The second example shown in FIG. 6 is similar to the first example in that the image forming apparatuses 10 and 30 and the server apparatus 20 are provided. Furthermore, in the second example, an image forming apparatus 50 connectable to the server apparatus 20 and the image forming apparatus 30 is also provided. The image forming apparatus 50 at least includes components identical to the components (see FIG. 4) of the image forming apparatus 30 described above.

In the second example, the leading job in the processing request is a translation process, and the apparatus that is to execute the translation process is the server apparatus 20. The trailing job is a printing process, and the apparatus that is to execute the printing process is the image forming apparatus 30. Furthermore, in the second example, the image forming apparatus 50 is designated as a substitute apparatus that performs printing in place of the image forming apparatus 30. Information indicating the image forming apparatus 50 is an example of information indicating a substitute apparatus serving as a substitute for an apparatus in a case where the apparatus becomes incapable of acquiring a processed document before acquiring the processed document.

In the second example, the server-apparatus-oriented transmission information to be transmitted to the server apparatus 20 and the client-apparatus-oriented transmission information to be transmitted to the image forming apparatus 30 include the contents mentioned above.

Since step S21 to step S23 in the second example are identical to step S11 to S13 in the first example, descriptions thereof will be omitted.

In the second example, if the image forming apparatus 30 has to shut down during periodic polling between the server apparatus 20 and the image forming apparatus 30, the image forming apparatus 30 notifies the server apparatus 20 before the shutdown that the image forming apparatus 50 serving as the substitute apparatus is to take over the trailing job in step S24. Moreover, the image forming apparatus 30 transmits, to the image forming apparatus 50 serving as the substitute apparatus, the client-apparatus-oriented transmission information including the document search key K1 and the trailing job information K2 in step S25. The trailing job information K2 includes a command for printing the document B2 as well as printing conditions.

Alternatively, step S24 described above for providing a takeover notification to the server apparatus 20 may be omitted.

Furthermore, as an alternative to the second example in which the image forming apparatus 50 serves as the substitute apparatus, the image forming apparatus 10 may conceivably serve as the substitute apparatus.

After the image forming apparatus 50 takes over the process from the image forming apparatus 30, periodic polling is performed between the server apparatus 20 and the image forming apparatus 50 in step S26.

When the document B2 (i.e., a document indicated by reference sign $ in FIG. 6) having undergone the translation process in the server apparatus 20 is transmitted to the image forming apparatus 50 in step S27, printing is performed in the image forming apparatus 50 in step S28.

Accordingly, in the second example, if the image forming apparatus 30 planning to acquire the document B2 and execute the trailing job becomes incapable of acquiring the document B2, the process is taken over by the image forming apparatus 50 designated as the substitute apparatus, so that the user may obtain a printed material of the document B2.

Furthermore, by operating the image forming apparatus 10, a series of processes from the document scanning process to the printing process may be performed, including a case where image processing that may possibly consume a shorter period of time than the translation process in the server apparatus 20 is to be performed.

Moreover, since a process similar to facsimile transmission is performed by designating an apparatus that scans the document B1 and acquires the document B2 and also designating printing as the trailing job, the time and effort used for the operation may be omitted, as compared with an operation in the related art that involves downloading the document B2 and then performing facsimile transmission.

Third Example

FIG. 7 illustrates the third example as one of the processing examples in the case where the image forming apparatus 10 acquires the processing request.

The third example shown in FIG. 7 is similar to the first and second examples in that the image forming apparatuses 10 and 30 and the server apparatus 20 are provided. Furthermore, in the third example, image forming apparatuses 61 and 62 are provided. Each of the image forming apparatuses 61 and 62 at least includes components identical to the components (see FIG. 4) of the image forming apparatus 30 described above. Moreover, in the third example, the image forming apparatus 10 also includes components identical to those of the image forming apparatus 30.

In the third example, the leading job in the processing request is a translation process, and the apparatus that is to execute the translation process is the server apparatus 20. The trailing job is facsimile transmission, and the image forming apparatus 30 is designated as the apparatus that is to execute the facsimile transmission.

Furthermore, in the third example, the image forming apparatuses 61, 62, and 10 are designated as substitute apparatuses that are to perform printing in place of the image forming apparatus 30. Moreover, priority levels are set for the substitute apparatuses. In the third example, the image forming apparatus 61 has the highest priority level, the image forming apparatus 62 has the second highest priority level, and the image forming apparatus 10 has the lowest priority level. Specifically, in the third example, the image forming apparatus 10 as an origin for transmitting the client-apparatus-oriented transmission information to the image forming apparatus 30 is set as a substitute apparatus.

The image forming apparatuses 61, 62, and 10 serving as the substitute apparatuses in the third example may conceivably be located within an on-premises environment. Information indicating the image forming apparatuses 61, 62, and 10 is an example of information indicating multiple apparatuses installed in an internal environment where the apparatuses are installed, and includes information indicating the priority levels of the substitute apparatuses to be described below.

Since step S31 to step S34 in the third example are identical to step S21 to step S24 in the second example, descriptions thereof may be omitted.

In the third example, if a process performed by the image forming apparatus 30 has to be taken over by another apparatus, the image forming apparatus 30 checks for a communicable state with the substitute apparatuses starting from higher priority levels. In the third example, since the image forming apparatus 61 with the highest priority level is in a non-communicable state, the next image forming apparatus 62 is inquired about whether it is in a communicable state. After confirming that the image forming apparatus 62 is in a communicable state and is capable of taking over the process, the image forming apparatus 30 transmits the client-apparatus-oriented transmission information including the document search key K1 and the trailing job information K2 toward the image forming apparatus 62 in step S35. The trailing job information K2 includes a command for transmitting the document B2 by facsimile as well as transmission conditions.

Subsequently, periodic polling is performed between the server apparatus 20 and the image forming apparatus 62 in step S36.

When the document B2 (i.e., a document indicated by reference sign $ in FIG. 7) having undergone the translation process in the server apparatus 20 is transmitted to the image forming apparatus 62 in step S37, the image forming apparatus 62 transmits the document B2 by facsimile to a facsimile receiver 70 in step S38.

Accordingly, in the third example, multiple apparatuses are designated as substitute apparatuses together with priority levels, so that an apparatus other than the image forming apparatus 30 may reliably take over the process.

First Exemplary Embodiment

Next, a first exemplary embodiment will be described.

Figure 8:
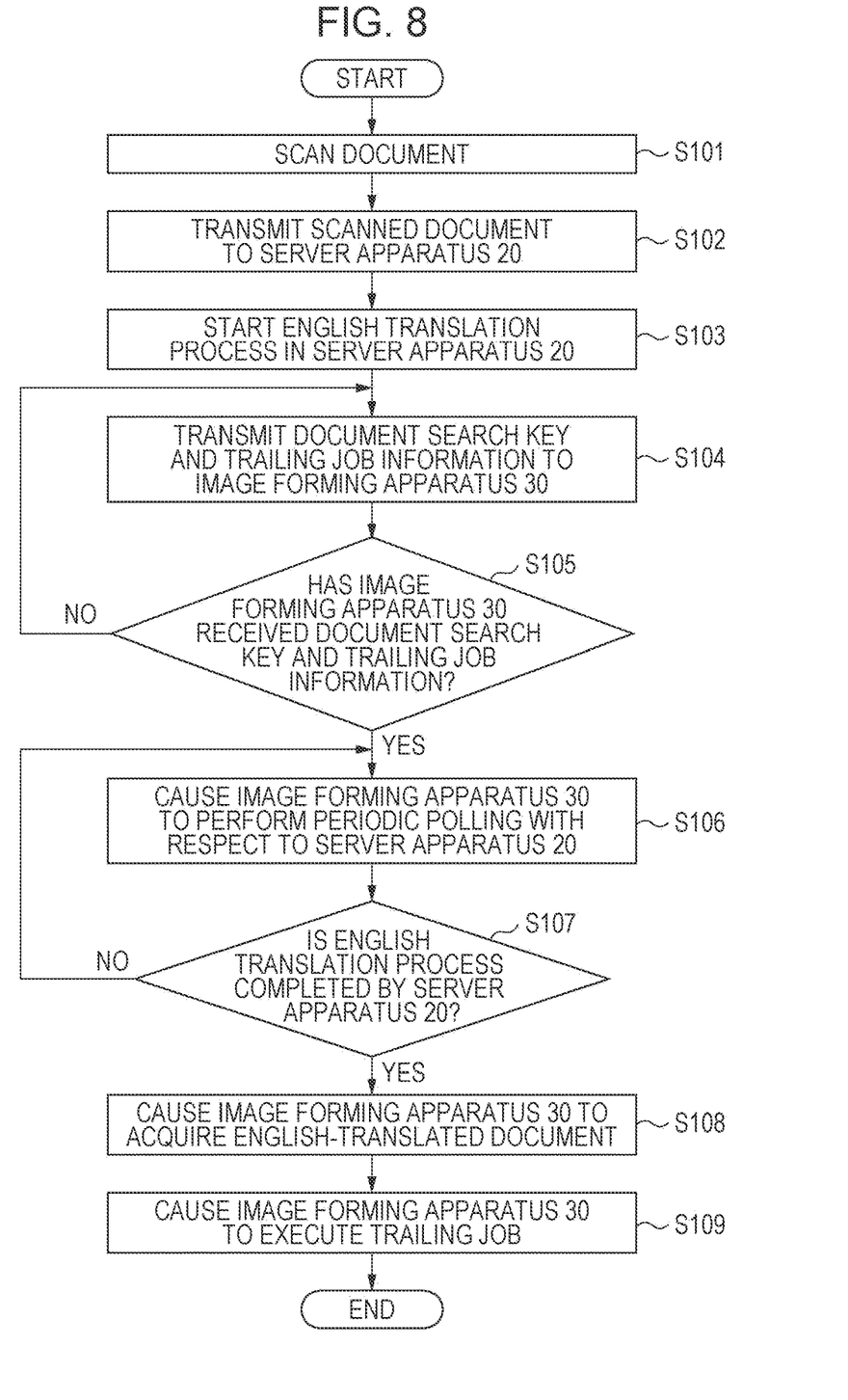
FIG. 8 is a flowchart illustrating a process according to a first exemplary embodiment.

FIG. 8 is a flowchart illustrating a process according to the first exemplary embodiment and corresponds to the first example described above.

As shown in FIG. 8, in the first exemplary embodiment, when a document is scanned in the image forming apparatus 10 in step S101, the image forming apparatus 10 transmits the scanned document (see reference sign B1 in FIG. 5) to the server apparatus 20 in step S102. In step S103, the server apparatus 20 receiving the scanned document starts an English translation process.

In step S104, the image forming apparatus 10 transmits a document search key (see reference sign K1 in FIG. 5) and trailing job information (see reference sign K2 in FIG. 5) to the image forming apparatus 30. The image forming apparatus 10 checks whether the image forming apparatus 30 has received the document search key and the trailing job information in step S105. If the image forming apparatus 30 has not received the document search key and the trailing job information (NO in step S105), the image forming apparatus 10 performs the transmission again in step S104.

If the image forming apparatus 30 has received the document search key and the trailing job information (YES in step S105), the image forming apparatus 30 uses the received document search key (see reference sign K1 in FIG. 5) to perform periodic polling with respect to the server apparatus 20 in step S106 for acquiring the processing status.

The image forming apparatus 30 confirms the processing status of the server apparatus 20 acquired as a result of the periodic polling, and determines in step S107 whether the English translation process is completed by the server apparatus 20. If the English translation process is not completed (NO in step S107), the determination is performed again based on the periodic polling in step S106.

If the English translation process is completed (YES in step S107), the image forming apparatus 30 acquires the English-translated document (see reference sign B2 in FIG. 5) from the server apparatus 20 in step S108. In step S109, the image forming apparatus 30 executes the trailing job in accordance with the trailing job information (see reference sign K2 in FIG. 5).

Second Exemplary Embodiment

Next, a second exemplary embodiment will be described.

Figure 9:
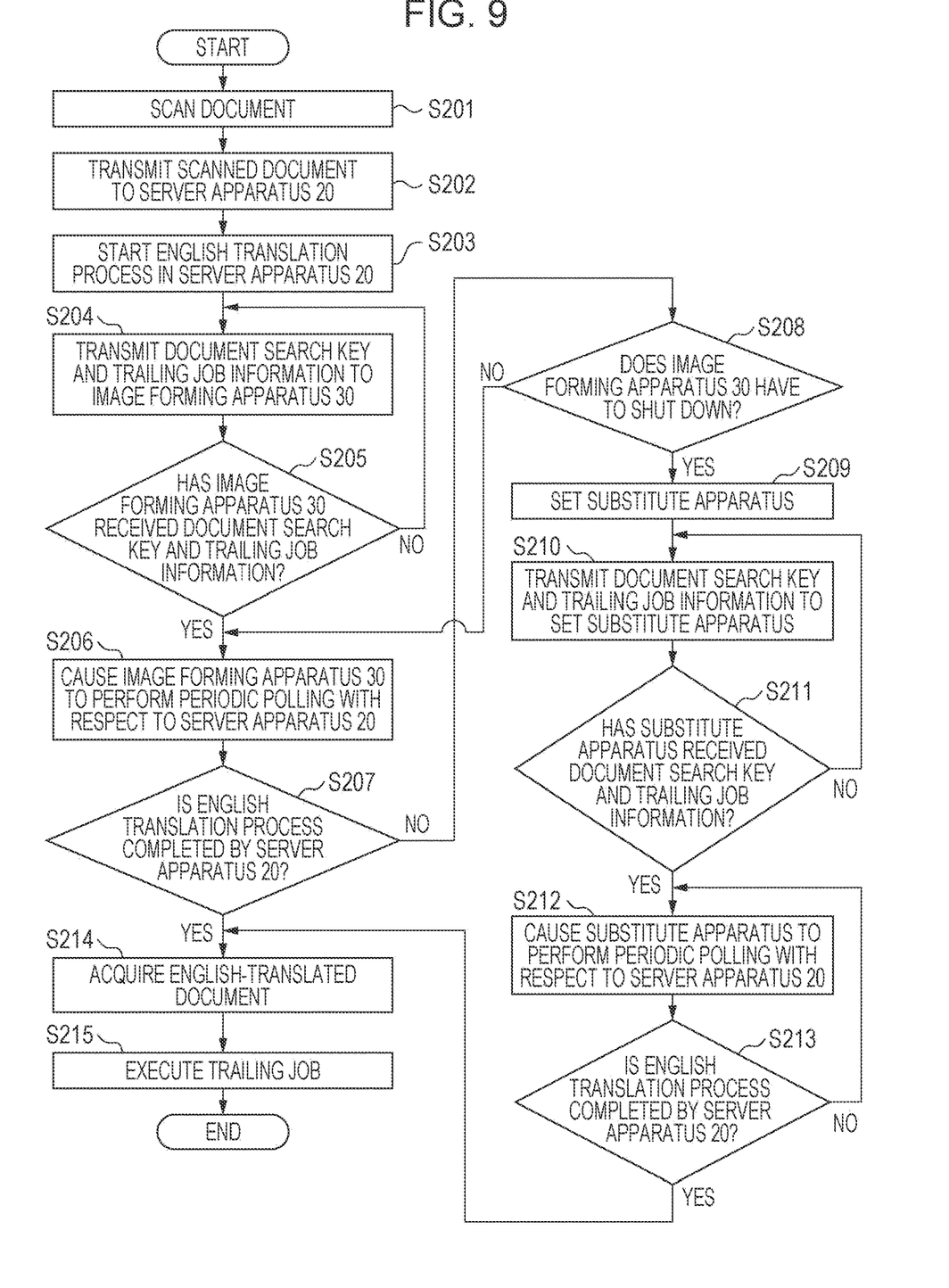
FIG. 9 is a flowchart illustrating a process according to a second exemplary embodiment.

FIG. 9 is a flowchart illustrating a process according to the second exemplary embodiment and corresponds to the second and third examples described above. Since step S201 to step S206 in the second exemplary embodiment correspond to step S101 to step S106 in the first exemplary embodiment, descriptions thereof may be omitted.

As shown in FIG. 9, in the second exemplary embodiment, in a case where it is to be determined in step S207 whether the English translation process is completed by the server apparatus 20 based on the processing status of the server apparatus 20 acquired as a result of the periodic polling, if the English translation process is not completed (NO in step S207), the image forming apparatus 30 checks whether or not the image forming apparatus 30 has to shut down in step S208.

If the image forming apparatus 30 does not have to shut down (NO in step S208), the process returns to step S206. If the image forming apparatus 30 has to shut down (YES in step S208), the image forming apparatus 30 sets a substitute apparatus in step S209.

If there is a single predetermined apparatus as a substitute apparatus, the relevant apparatus is set as the substitute apparatus (see the second example described above). If there are multiple predetermined apparatuses as substitute apparatuses, the setting is performed based on the priority levels set for the respective apparatuses (see the third example described above).

Subsequently, in step S210, the image forming apparatus 30 transmits a document search key and trailing job information to the set substitute apparatus. The image forming apparatus 30 checks whether the substitute apparatus has received the document search key and the trailing job information in step S211. If the substitute apparatus has not received the document search key and the trailing job information (NO in step S211), the image forming apparatus 30 performs the transmission again in step S210.

If the substitute apparatus has received the document search key and the trailing job information (YES in step S211), the substitute apparatus uses the received document search key (see reference sign K1 in FIG. 5) to perform periodic polling with respect to the server apparatus 20 in step S212 for acquiring the processing status.

The substitute apparatus confirms the processing status of the server apparatus 20 acquired as a result of the periodic polling, and determines in step S213 whether the English translation process is completed by the server apparatus 20. If the English translation process is not completed (NO in step S213), the determination is performed again based on the periodic polling in step S212.

If the English translation process is completed (YES in step S213), the substitute apparatus acquires the processed document (see reference sign B2 in FIG. 6 or 7) from the server apparatus 20 in step S214. In step S215, the substitute apparatus executes the trailing job in accordance with the trailing job information (see reference sign K2 in FIG. 6 or 7).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
acquire a processing request that includes a document;
request an external server to perform a process included in the acquired processing request, the external server being connectable from the information processing apparatus and being responsible for performing the process; and
transmit second information to an apparatus communicable with the information processing apparatus, the second information including first information to be used for acquiring a processed document serving as the document processed by the external server,
wherein each of or one of the request to the external server and the second information includes information designating a unit of acquisition of the processed document by the apparatus, the information designating the unit includes information indicating a predetermined part of the entire processed document.

2. The information processing apparatus according to claim 1, wherein the second information includes information indicating a process to be performed on the processed document by the apparatus.

3. The information processing apparatus according to claim 2, wherein the information indicating the process to be performed by the apparatus includes a command for printing the processed document and a printing condition.

4. The information processing apparatus according to claim 2, wherein the information indicating the process to be performed by the apparatus includes a command for forwarding the processed document to another apparatus installed in an internal environment where the apparatus is installed and a forwarding condition.

5. The information processing apparatus according to claim 2, wherein the information indicating the process to be performed by the apparatus includes a command for transmitting the processed document by facsimile and a transmission condition.

6. The information processing apparatus according to claim 1, wherein the second information includes information indicating a substitute apparatus serving as a substitute for the apparatus in a case where the apparatus becomes incapable of acquiring the processed document before acquiring the processed document.

7. The information processing apparatus according to claim 6, wherein the information indicating the substitute apparatus includes information indicating a plurality of apparatuses installed in an internal environment where the apparatus is installed.

8. The information processing apparatus according to claim 7, wherein the information indicating the plurality of apparatuses includes information indicating a priority level for the substitute apparatus.

9. The information processing apparatus according to claim 7, wherein the information indicating the plurality of apparatuses includes information indicating a priority level for the substitute apparatus and information indicating the information processing apparatus set at a lowest priority level.

10. The information processing apparatus according to claim 6, wherein the information indicating the substitute apparatus includes information indicating the information processing apparatus.

11. The information processing apparatus according to claim 1, wherein a selection is made from a candidate other than the apparatus in a case where communication with the apparatus is not possible.

12. A non-transitory computer readable medium storing a program causing a computer to execute a process, the process comprising:
acquiring a processing request that includes a document;
requesting an external server to perform a process included in the acquired processing request, the external server being connectable from an information processing apparatus and being responsible for performing the process; and
transmitting second information to an apparatus communicable with the information processing apparatus, the second information including first information to be used for acquiring a processed document serving as the document processed by the external server,
wherein each of or one of the request to the external server and the second information includes information designating a unit of acquisition of the processed document by the apparatus, the information designating the unit includes information indicating a predetermined part of the entire processed document.

13. An information processing method comprising:
acquiring a processing request that includes a document;
requesting an external server to perform a process included in the acquired processing request, the external server being connectable from an information processing apparatus and being responsible for performing the process; and
transmitting second information to an apparatus communicable with the information processing apparatus, the second information including first information to be used for acquiring a processed document serving as the document processed by the external server,
wherein each of or one of the request to the external server and the second information includes information designating a unit of acquisition of the processed document by the apparatus, the information designating the unit includes information indicating a predetermined part of the entire processed document.

* * * * *